(12) United States Patent
Rompe

(10) Patent No.: US 8,360,230 B2
(45) Date of Patent: Jan. 29, 2013

(54) METHOD AND APPARATUS FOR MEASURING A PARAMETER DURING THE TRANSPORT OF OBJECTS TO A PROCESSING DEVICE

(75) Inventor: Andre Rompe, Berlin Kaulsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 111 days.

(21) Appl. No.: 13/078,420

(22) Filed: Apr. 1, 2011

(65) Prior Publication Data

US 2011/0240439 A1 Oct. 6, 2011

(30) Foreign Application Priority Data

Apr. 1, 2010 (DE) .......................... 10 2010 013 677

(51) Int. Cl.
*B65G 47/31* (2006.01)

(52) U.S. Cl. ..................... 198/460.1; 198/358; 198/572; 700/230

(58) Field of Classification Search ............... 198/460.1, 198/358, 349, 572; 700/228, 229, 230; 382/312
See application file for complete search history.

(56) References Cited

U.S. PATENT DOCUMENTS

| | | | |
|---|---|---|---|
| 3,227,263 A | | 1/1966 | Kastenbein |
| 3,373,685 A | | 3/1968 | Adams |
| 4,940,536 A | | 7/1990 | Cowlin et al. |
| 5,038,911 A | * | 8/1991 | Doane et al. .................. 198/357 |
| 5,141,097 A | | 8/1992 | Oiry et al. |
| 5,165,520 A | | 11/1992 | Herve et al. |
| 5,719,678 A | * | 2/1998 | Reynolds et al. ............. 356/627 |
| 6,629,018 B2 | * | 9/2003 | Mondie et al. ................ 700/228 |
| 7,090,067 B2 | * | 8/2006 | Schiesser et al. .......... 198/460.1 |
| 7,216,013 B2 | * | 5/2007 | Kibbler .......................... 700/229 |
| 7,233,840 B2 | * | 6/2007 | Schiesser et al. ............. 700/230 |
| 8,201,681 B2 | * | 6/2012 | Schiesser et al. .......... 198/460.1 |
| 2002/0046923 A1 | | 4/2002 | Herubel et al. |

FOREIGN PATENT DOCUMENTS

| | | |
|---|---|---|
| CH | 463846 A | 10/1968 |
| DE | 1160792 B | 1/1964 |
| DE | 4129135 A1 | 3/1992 |

(Continued)

OTHER PUBLICATIONS

Lopez et al., "Passenger Density Measurement in a Train Carriage using Image Processing", Transportation Systems 1997: A proceedings Volume from the 8th IFAC.IGIP/IFORS Symposium, Chania, Greece, Jun. 16-18, 1997, Oxford, pp. 961-966, XP006150834.

*Primary Examiner* — James R Bidwell
(74) *Attorney, Agent, or Firm* — Laurence A. Greenberg; Werner H. Stemer; Ralph E. Locher

(57) ABSTRACT

A method and an apparatus measure a quantity parameter during the transport of objects. The objects are in particular flat mail items and are tipped onto a conveyor component of a transport device and are transported by the latter. At least one recording time, in each case at least one photograph of a measurement sector of the conveyor component is taken. For each recording time, the value which a quantity parameter which describes the quantity of objects in the measurement sector has at the recording time is calculated. For this purpose, the proportion of the area of the measurement sector which is covered by objects is measured. A prescribed functional relationship between the quantity parameter and the measured proportion is evaluated. The speed at which the conveyor component transports the objects is changed depending on the quantity parameter value measured.

14 Claims, 5 Drawing Sheets

FOREIGN PATENT DOCUMENTS

| | | |
|---|---|---|
| DE | 4129142 A1 | 3/1992 |
| DE | 4240094 C2 | 10/1995 |
| DE | 10038690 C1 | 7/2001 |
| WO | 2007000441 A1 | 1/2007 |

\* cited by examiner

A

B

C

METHOD AND APPARATUS FOR MEASURING A PARAMETER DURING THE TRANSPORT OF OBJECTS TO A PROCESSING DEVICE

CROSS-REFERENCE TO RELATED APPLICATION

This application claims the priority, under 35 U.S.C. §119, of German patent application DE 10 2010 013 677.8, filed Apr. 1, 2010; the prior application is herewith incorporated by reference in its entirety.

BACKGROUND OF THE INVENTION

Field of the Invention

The invention relates to a method and an apparatus for measuring a parameter which describes the transport of objects. The objects are transported by way of a transport device.

The object of measuring the parameter during transport can be achieved in particular if the transport device transports the objects to a processing device and the quantity of objects which pass through the processing device per unit of time is intended to remain within a prescribed range. The desired range depends on the processing capacity of the processing device.

A generic method and a generic apparatus are described in published international patent application WO 2007/000441 A1. There, a method is described in order to monitor and to regulate the transport and the selection of objects, such as fruit, etc. The objects are tipped onto a first conveyor belt 3 and are transported by the conveyor belt 3 under and through a counting arrangement 11 to a second conveyor belt 5. The counting arrangement 11 continuously ascertains the number of transported objects in an area sector A on the surface of the first conveyor belt 3. The counting arrangement 11 comprises a camera which continuously takes depictions of the area sector A and determines the degree of filling of the area sector A which the objects 2 cover. For this purpose, the counting arrangement 11 uses the number of objects and derives the degree of filling therefrom, cf. page 6/first paragraph. Depending on the number determined, a regulator 14 changes the transport speed of the first conveyor belt 3 in order to keep the quantity of transported objects within a prescribed range.

U.S. Pat. No. 5,141,097 and German published patent application DE 41 29 135 A1 describe an apparatus and a method for the regulated transportation of objects. The apparatus transports mail items in the form of packets to a format separating device with a drum ("separation drum"). The mail items lie on a supply device having two horizontal endless conveyor belts. A camera produces a depiction from above of the mail items lying on the supply conveyor belt positioned downstream for this purpose, the endless conveyor belt is illuminated from above. The number of mail items lying on the supply conveyor belt is counted by evaluation of the depiction. The transport speed at which the endless conveyor belt transports mail items to the format separating device is regulated depending on the number. A regulator correspondingly activates a driving motor of the endless conveyor belt.

In the exemplary embodiment of U.S. Pat. No. 5,141,097 and DE 41 29 135 A1, the mail items to be transported are packets which lie at a distance from one another on the supply device and have a relevant size in all three dimensions. If, by contrast, the transport of flat objects, for example letters, is to be regulated by the method described in U.S. Pat. No. 5,141, 097, the problem occurs that a plurality of objects—as seen in the direction of depiction of the camera—lie one above another or overlap one another. In this case, it is frequently not possible at all to directly count the objects. In any case, direct counting requires complicated image processing and/or an additional sensor arrangement. Direct counting would nevertheless frequently result in considerable errors.

U.S. Pat. No. 5,165,520 and German published patent application DE 41 29 142 A1 describe an apparatus which monitors and regulates the transport of packets or freight. The packets 2 are transported by a first conveyor belt 1 to a feeding drum 4 having internal blades 5, cf. FIG. 1. The packets 2 slide out of the drum 3 onto a further transport belt 10 consisting of two individual conveyor belts 10a and 10b. A light barrier 11 measures when a packet 2 is transported beyond the slot between the conveyor belts 10a, 10b. The light barrier 11 has a plurality of cells 12 and extends beyond the entire width of the slot. The distance between two packets 2 is regulated by means of the values measured by the light barrier 11 and the transport speed of the transport belt 10. A video camera 23 above the conveyor belt 10 supplies depictions which are evaluated in order to identify when two packets overlap or lie one above the other. Such packets are brought by a deflecting plate 20 from the conveyor belt 10 onto a further conveyor belt 22. In order to identify overlaps, a processed image from the video camera 23 is evaluated in a plurality of steps. In the steps, the contours of the depicted objects are identified, the silhouette is extracted, the silhouette is approximated by a polygon, and the polygon is investigated for convexity.

U.S. Pat. No. 4,940,536 describes an arrangement which sorts spherical objects, for example fruit or potatoes. The objects are tipped onto a first conveyor belt ("conveyor 1") which transports the objects. The transported objects pass through an "inspection region A-B" in which the objects are rotated. A camera 33 above the first conveyor belt 1 uses a mirror 32 to produce depictions of the inspection region A-B containing objects being transported. FIG. 9 illustrates an inspection region A-B of this type. Four rollers 84, 85, 86, 87 all move in the direction of the arrow 88 and, in the process, rotate the objects which are located in the gaps 80, 81, 82 between the rollers 84, 85, 86, 87. FIG. 10 shows the respective temporal profile of a plurality of signals, including the profile 91 of the measured luminescence produced by the objects in the gap 80. The temporal profile 91 is processed, and the processed profile 92 clearly shows where—as seen over the width of the gap 80—objects are and are not located in the gap 80. As a result, the objects can be counted and the spatial extent thereof can be determined.

Patent application publication US 2002/0046923 A1 describes an arrangement which brings transported objects into a queue of consecutive objects. In the exemplary embodiment, the arrangement comprises five successive endless conveyor belts 1, 2, 3, 4, 5 which are guided around horizontal axes and rollers. Flat objects 15 are tipped onto the first conveyor belt 1 and are transported by the sequence of conveyor belts 1, 2, 3, 4, 5. The fourth conveyor belt 4 has a multiplicity of individual endless conveyor belts 11a to 11j which are arranged parallel to one another ("juxtaposed side by side") and can be switched on and off independently of one another and can be driven into a configuration at different speeds 28. A camera 23 above the conveyor belts takes the images of the surface of the conveyor belts 3 and 4 and transmits the depictions to a regulator 24 which activates the drives for the individual conveyor belts 11a to 11j.

U.S. Pat. No. 3,227,263 and German published patent application DE 1160792 A describe a device for uniformly feeding a conveyor section with flat mail items. The intention is to compensate for the fluctuating conveyor density in the conveyor section. A control means changes the speed at which a conveyor belt of the conveyor section transports the mail items. A light barrier 12, 12' is arranged at the beginning of the downwardly inclined conveyor belt. The light barrier 12, 12' acts as a sensor for a regulator which activates the drive of the conveyor belt.

German patent DE 42 40 094 C2 describes an apparatus which monitors a conveyor system having a belt conveyor. The belt conveyor 2 transports bulk material by means of a moving belt 3. A CCD camera 6 takes images from above, with the respective image sector 8 reaching over the entire width of the belt conveyor 3, cf. the end view from FIG. 1. A distance AL or AR occurs in each case between the two edges of the belt 3 and the supporting framework 5 and a distance BL or BR occurs in each case between the product being conveyed and the edges. A further camera 23a produces depictions from the lower side of the belt conveyor 2. The troughing 13, i.e. the sag in the belt 3 due to the weight of the bulk material, the profile of the upper edge OK of the bulk material and the cross sectional area F are determined. The cross sectional area F is the area taken up by the bulk material in an imaginary, perpendicular plane which is also perpendicular to the transport direction of the product being conveyed. The distances AL, AR, BL, BR and the contour OK are determined for this from the signals from the camera 6. In the depictions, the bulk material is differentiated from the supporting framework 5 by successive depictions being subtracted. In addition, a plurality of differential images are accumulated. In order to ascertain the cross sectional area F, a plurality of belt profiles having different loads are determined experimentally in advance and stored ("off-line"). Or the belt profile is determined on-line by means of the lower camera 23. The cross sectional area F is calculated by means of the troughing 13, the profile and the surface contour OK. The conveyor volume being transported is ascertained from the area F and the conveyor speed. In addition, the actual distances BL, BR are compared with desired values BL_Des, BR_Des.

U.S. Pat. No. 3,373,685 and Swiss patent CH 463846 describe a letter mail handling machine. A conveyor belt transports mail items to a primary separator section and from there to a secondary separator section. Sensors monitor this course of the letters.

SUMMARY OF THE INVENTION

It is accordingly an object of the invention to provide a method and an apparatus for measuring a parameter during the transport of objects to a processing device which overcome the above-mentioned disadvantages of the heretofore-known devices and methods of this general type and which permit a measurement and, if the need arises, regulation even if objects may be lying one above another on the conveyor component and therefore counting of the objects on the conveyor component is not possible at all.

With the foregoing and other objects in view there is provided, in accordance with the invention, a method for automatically measuring a quantity parameter, the quantity parameter describing a transport of objects by way of a conveyor component, with the objects to be transported lying on the conveyor component during the measurement, the method which comprises:

at least one recording time, taking in each case at least one computer-evaluatable photograph of a measurement sector of the conveyor component, and determining a value for a quantity parameter that describes a quantity of objects transported at the recording time, wherein each determining step includes a step of evaluating the at least one photograph taken at the recording time, measuring, for each recording time during the determination of the quantity parameter value, a proportion of a respective measurement sector which is covered at the recording time by objects lying on the conveyor component, and thereby evaluating the photograph of the respective measurement sector taken at the recording time; and calculating the value taken on by the quantity parameter at the recording time, and thereby applying to the covered proportion measured a prescribed, computer-executable, functional relationship between the quantity parameter and the covered proportion of the measurement sector.

The objects of the invention are achieved by the claimed method and the claimed device as recited in the appended claims.

A plurality of objects lie on a conveyor component of a transport device. The transport device moves the conveyor component. As a result, the conveyor component transports the objects at a temporally variable transport speed.

At least one recording time, at least one computer-accessible and computer-evaluatable photograph of a measurement sector of the conveyor component is taken. The at least one photograph is evaluated. As a result, a value for a quantity parameter is calculated for each recording time. The quantity parameter value describes the quantity of objects transported at the respective recording time. The quantity parameter depends on the quantity of objects lying and being transported on the conveyor component.

The transport speed of the conveyor component is changed depending on the at least one quantity parameter value measured. Of course, it is possible that the transport speed already has the correct value and no longer needs to be changed.

According to the invention, at each recording time, the proportion of the measurement sector which is in each case covered by objects which are being transported and which lie in the measurement sector on the conveyor component at the recording time is measured. Since the conveyor component is moved and, as a result, is also moved relative to an image recording device for the computer-accessible photographs, a different part of the conveyor component acts in each case as the measurement sector.

The proportion covered by objects being transported is calculated as the area covered by objects, with reference to the entire area of the measurement sector. In order to calculate the covered proportion, the at least one photograph of the measurement sector, which has been taken at the recording time, is automatically evaluated.

A computer-executable functional relationship between the quantity parameter to be measured and the covered proportion of the measurement sector is prescribed and stored in a data memory. The value taken on by the quantity parameter at the recording time is calculated. For this purpose, use is made of the covered proportion measured and of the prescribed functional relationship. The functional relationship is automatically applied to the covered proportion measured in order to ascertain the value of the quantity parameter.

According to the invention, the area in the measurement sector on the conveyor component which is covered by objects being transported is measured. The covered area can be measured even if a plurality of objects being transported lie partially one above another in the measurement sector. This situation may occur in particular in the case of flat objects which lie on the conveyor component. The method can therefore be used even if a plurality of objects—as seen in the direction of depiction of an image recording device used—at least partially overlap or even if one object largely covers another object on the conveyor component.

The invention therefore permits the following procedure: a temporally variable flow parameter and a desired range are prescribed. The flow parameter describes the flow of objects being transported by the transport device to a processing device. The desired range lies within the range of values of the flow parameter. The flow parameter value should lie within the prescribed desired range, wherein the desired range depends, for example, on the processing capacity of the processing device. A regulator regulates the transport speed of the conveyor component such that the actual value of the flow parameter always remains within the desired range. For the regulation of the transport speed, the regular repeatedly receives in each case at least one measured value from the sensor according to the solution. The measured values of the quantity parameter have significantly fewer errors than when directly counting how many objects are lying on the conveyor components. In order to regulate the speed of the conveyor component, use is made of a sensor according to the solution which supplies a quantity parameter value at each recording time. In addition, the sensor according to the solution supplies the quantity parameter values more rapidly at the same computational power than if the sensor has had to directly count the objects presented in the depiction. The method therefore makes it optionally possible to obtain a higher scanning rate at the same computational power or to manage with lower computational power for the same scanning rate.

The method according to the invention and the apparatus according to the invention do not require any additional outlay on apparatus in comparison to the apparatus described in the above-noted U.S. Pat. No. 5,141,097. A customary image recording device and a customary computational unit for the image evaluation are sufficient. It is not necessary to determine, by evaluation of a complex contour of an object on the conveyor component, of how many items the object consists. In particular, it is not required to determine object edges which are shown in depictions of the measurement sector. Furthermore, it is not necessary to identify geometrical contours, for example right angles, of objects depicted in the depiction. The evaluation steps require computational time and presuppose prior knowledge of the contours of the objects being transported.

The invention envisages measuring the covered area and calculating a value for the quantity parameter from the covered area measured. The above-noted international application publication WO 2007/000441 A1 describes precisely the opposite approach: the number of objects is measured (the number acts there as the quantity parameter), and the covered area is derived from the number measured.

Owing to the invention, the quantity parameter can be measured even if the objects being transported lie and are transported on the conveyor component in such a manner that a plurality of objects may overlap instead of being spaced apart from one another. This situation occurs in particular if flat objects are tipped randomly onto the conveyor component and therefore the situation may arise that a plurality of objects partially overlap, as seen in the viewing direction of a camera producing depictions of the measurement sector. The invention saves the necessity, even in this situation, of singulating the objects in order to produce a distance between each two objects, before measuring the quantity parameter. On the contrary, it is even possible for the measured value of the quantity parameter to be used to regulate a following singulator or the supply of objects to the singulator and to use the quantity parameter value for this. However, the invention can also be used for measuring the quantity parameter in the case of objects which have already been singulated.

The invention does not presuppose any prior knowledge of the geometrical form of the objects being transported or any assumptions about the objects. In particular, it is not a necessary prerequisite for all of the objects to be rectangular—as seen from the viewing direction of the image recording device which produces the photographs.

The invention requires merely a single image recording device as the sensor mechanism. It is not required to provide a plurality of image recording devices which produce photographs from different image directions in order to evaluate the photographs in combination. Of course, it is possible to provide different image recording devices, for example in order to produce redundancy.

It is not necessary to ensure that the length of the measurement sector—i.e. the size of the measurement sector in the transport direction—is smaller than or equal to the maximum size of an object being transported. On the contrary, the method can be used even if an object projects over the measurement sector both in the transport direction and in the opposite direction. The measurement sector can take up the entire width of the conveyor component or a strip in the interior of the surface of the conveyor component.

A sequence of depictions of the measurement sector is preferably produced and evaluated continuously. This configuration permits continuous regulation of the speed at which the conveyor component transports the objects to a following processing device. Owing to the invention, a sufficiently high scanning rate can be obtained.

The frequency of the taking of photographs is preferably set in such a manner that the frequency is proportional to the transport speed of the conveyor component.

A plurality of successive recording times $t[1], t[2], \ldots$ are preferably prescribed. At each prescribed recording time $(t[1], t[2], \ldots$ at least one photograph of the conveyor component is produced in each case. The measurement sector shown by the photograph at a recording time $t[i]$ is preferably directly adjacent to the measurement sector shown by the photograph from the immediately preceding recording time $t[i-1]$. The image recording device used supplies rough photographs. If the measurement sectors shown overlap, the region of overlap is calculated therefrom. The processing photographs in which the measurement sectors are seamlessly adjacent to one another, rather than the rough photographs, are then used as the photographs.

The functional relationship is preferably determined experimentally in advance and stored. This approach does not require an analytical model for the functional relationship. The step described below is carried out repeatedly. A plurality of objects are transported by the transport device or a corresponding transport device, wherein the value which the quantity parameter assumes for the objects being transported is known or measured. For example, it is counted in advance how many objects are located on the transport device. The area covered by the objects is measured. Firstly, various steps are carried out with different values for the quantity parameter. Secondly, however, a plurality of steps are also carried out for the same value of the quantity parameter, but with the density of the objects lying on the conveyor component differing. In the event of flat objects, different degrees of overlap are produced. This means that different numbers of objects partially overlap in each case. The various measured values for the same quantity parameter value are aggregated to form a value which is incorporated into a functional relationship, for example in the form of an average value.

The functional relationship can be produced by means of a real transport device and a sample having real objects. It is also possible for a plurality of simulation runs to be carried out by means of a computer-evaluatable simulation model of the transport device. For each simulation run, the number of objects to be transported and the outline contour of each object and the position of each object in the measurement sector are prescribed. It is possible for a random generator to prescribe different numbers and different decisions and outline contours.

In one application of the invention, the transport device transports the objects to a singulator. The singulator is intended to singulate the objects in such a manner that a stream of spaced-apart objects leaves the singulator. The singulator is therefore intended to produce a succession of objects, wherein the distance between two consecutive objects is always approximately equal to a prescribed desired distance which is identical for all of the objects ("constant gap"). In this application, the "singulating potential", i.e. the sum of the lengths of the objects in the measurement sector plus the desired distance behind each of the objects, is preferably used as the quantity parameter. The size of the object, as seen in the transport direction during transportation after the singulating operation, is used as the length. In the case of two objects having a length of 100 mm and two objects having a length of 150 mm and a desired distance of 20 mm, the value for the singulating potential is (2*100)+(2*150)+(3*20)=560 [mm]. A desired singulating potential of the singulator is prescribed as a measure of the outflow of objects away from the singulator. The embodiment of the invention is used in order to regulate the stream of objects to the singulator in such a manner that the inflow to the singulator is approximately identical to the outflow from the singulator, and both the situation in which the singulator no longer receives any objects for singulating and the situation in which objects backup upstream of the singulator are avoided.

Examples of objects being transported include flat mail items, banknotes, sheets of paper or chip cards.

Other features which are considered as characteristic for the invention are set forth in the appended claims.

Although the invention is illustrated and described herein as embodied in a method and apparatus for measuring a parameter during the transport of objects to a processing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the exemplary embodiment, the method according to the invention and the apparatus according to the invention are used to process flat mail items (large letters, standard letters, catalogs, postcards and the like). A processing device processes the mail items. In order to obtain as high a throughput through the processing device as possible without risking the processing device becoming overloaded or mail items being backed up, the actual supply rate to the processing device is to be regulated and is not to differ too greatly from a prescribed desired supply rate.

Figure 1:
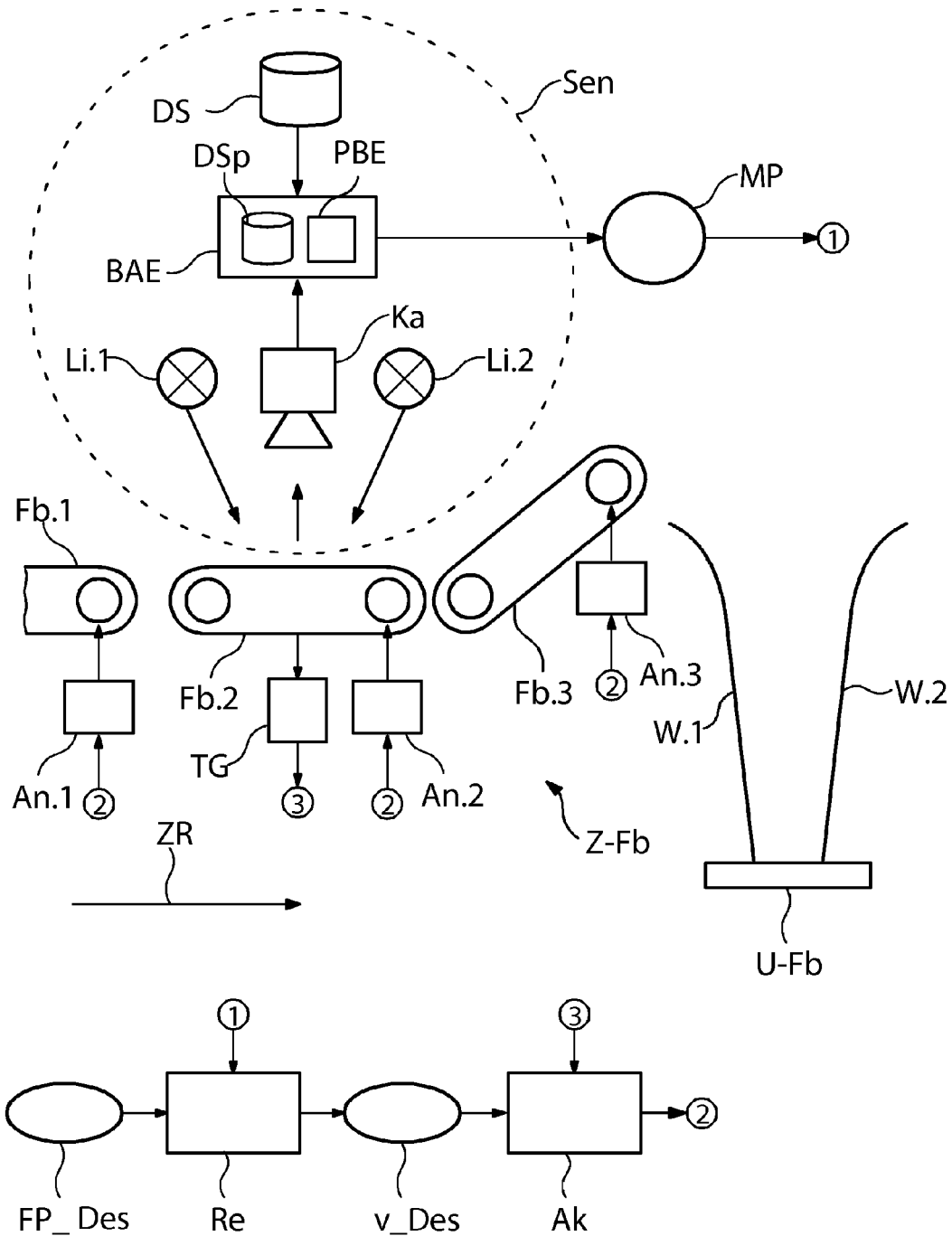
FIG. 1 is a schematic side view of an exemplary embodiment of the apparatus according to the invention.
Figure 2:
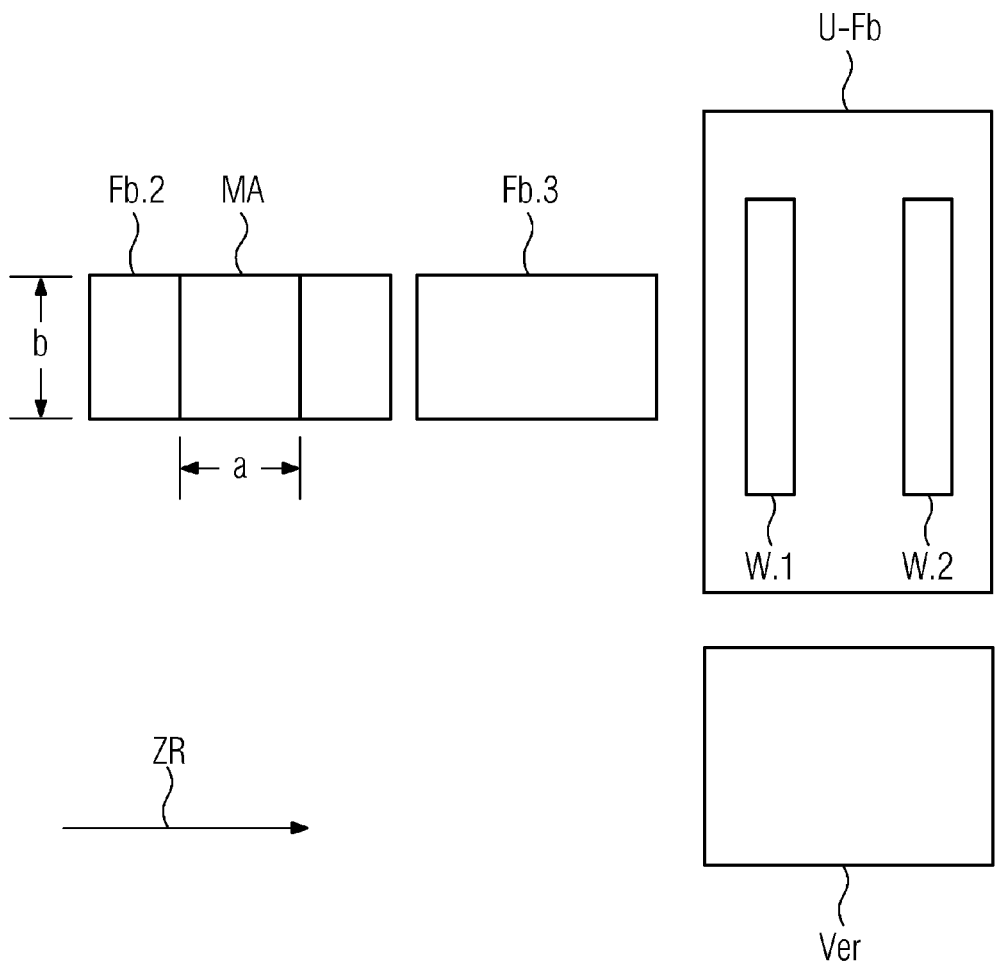
FIG. 2 shows the apparatus of FIG. 1 in top view.

FIG. 1 shows schematically the apparatus of the exemplary embodiment in side view. FIG. 2 shows the apparatus from FIG. 1 schematically in top view.

A supply conveyor belt Z-Fb comprises two horizontal endless conveyor belts Fb.1, Fb.2 and an oblique supply conveyor belt Fb.3, which transport mail items in a supply direction ZR.

The mail items to be processed are tipped in a random sequence and random arrangement onto an endless conveyor belt of the supply device Z-Fb. Each endless conveyor belt Fb.1, Fb.2, Fb.3 is guided around at least two rollers. Just one roller is driven and all of the other rollers are configured as swiveling rollers. Each roller is mounted on a horizontal or oblique shaft or axle. It is possible for one shaft or axle to be arranged higher than another shaft or axle. Each endless conveyor belt Fb.1, Fb.2, Fb.3 is capable of transporting the flat mail items in a horizontal or else obliquely inclined transport direction.

Each endless conveyor belt Fb.1, Fb.2, Fb.3 belongs to the supply device of the exemplary embodiment. The entirety of the endless conveyor belts Fb.1, Fb.2, Fb.3 is referred to below as a whole as a "supply conveyor belt Z-Fb". In the exemplary embodiment, the supply device acts as the transport device, and the supply conveyor belt Z-Fb acts as the conveyor component.

The mail items are guided past a sorting station. In the sorting station, those mail items which cannot be processed mechanically and therefore should not reach the processing device are removed from the processing operation, as are other objects which have reached the processing operation. The sorting station is not shown in the figures. The mail items are preferably first of all guided past the sorting station and then reach the supply conveyor belt Z-Fb. The mail items which can not be processed mechanically and other objects therefore do not reach the supply conveyor belt Z-Fb at all.

The mail items are subsequently guided by the supply conveyor belt Z-Fb past an apparatus. The apparatus comprises:

a sensor Sen according to the invention;

a regulating device with a regulator Re and an actuator Ak; and three drives An.1, An.2, An.3 for the three endless conveyor belts Fb.1, Fb.2, Fb.3.

The term "regulating device" is used herein interchangeably with "closed-loop control device" and the term "regulator" should be understood as being synonymous with "closed-loop controller."

The sensor Sen comprises a light source Li (Li.1, Li.2);

a camera Ka; and an image evaluation unit BAE.

The light source from the camera Ka illuminates the measurement sector MA (described below) of the supply conveyor belt Z-Fb uniformly and without dazzling.

The light source Li preferably emits white or infrared light. In order to obtain as great a contrast as possible, the surface of the supply conveyor belt Z-Fb is manufactured from a dark and matt, i.e. non-glossy material. A mail item is generally white or has a different light color, and therefore a great contrast is obtained between the dark surface of the supply conveyor belt Z-Fb and the light mail items lying on the dark supply conveyor belt Z-Fb.

In the exemplary embodiment, the light source Li comprises two individual light sources Li.1, Li.2 which illuminate the same measurement sector on the supply conveyor belt Z-Fb from two different directions. It is also possible for use to be made of only one or of more than two light sources which illuminate the measurement sector MA from different directions. In one configuration, the supply conveyor belt Z-Fb is illuminated indirectly, specifically by means of diffuse reflection.

The camera Ka is arranged above the supply conveyor belt Z-Fb and is capable of taking depictions of the measurement sector MA on the surface of the supply conveyor belt Z-Fb. The measurement sector MA is, for example, a rectangle having the edge lengths A and B and is illustrated in FIG. 2. As measurement sector MA, in the exemplary embodiment, a sector of the surface of the endless conveyor belt Fb.2 is illuminated. In this case, a denotes the length of the measurement sector MA, seen in the transport direction TR, in which the supply conveyor belt Z-Fb transports mail items.

In one configuration, the width b is equal to the width of the supply conveyor belt Z-Fb. In another configuration, the width b is smaller, and therefore the measurement sector MA lies in a strip in the interior of the supply conveyor belt Z-Fb. In this case, the value of the quantity parameter MP has to be enlarged, for example by the quotient from the width of the supply conveyor belt Z-Fb and the width b of the measurement sector MA.

In one configuration, the depiction direction of the camera Ka is perpendicular to the surface of the supply conveyor belt Z-Fb and therefore perpendicular to the measurement sector. However, it is also possible for the depiction direction to be perpendicular to the surface of the supply conveyor belt Z-Fb, for example because the camera Ka is thereby better protected or because the existing space is better used.

The camera Ka needs merely to have a comparatively low resolution, for example a resolution according to the VGA standard. The use of a black and white image camera suffices. Therefore, the camera Ka can be more cost effective and robust than in the case of other apparatuses.

The image evaluation unit BAE evaluates the depictions which are produced by the camera Ka, and produces measured values in the form of signals which are transmitted to the regulator Re. The image evaluation unit BAE comprises a parameter value calculation unit PWB which calculates the values for the quantity parameter MP from the depictions, and a data memory DSp for a functional relationship between the quantity parameter MP and the covered proportion.

The regulating device Re, Ak processes measured values from the sensor Sen and activates the actuator Ak. The actuator Ak sends actuating commands to the drives An.1, An.2, An.3 for the driven rollers of the supply conveyor belt Z-Fb. The drives An.1, An.2, An.3 enable the driven rollers for the supply conveyor belt Z-Fb to be moved at a controllable speed v, and thereby to cause the supply conveyor belt Z-Fb to transport objects to the processing device at a controllable transport speed v. In FIG. 1, thin arrows show data flows and thick arrows show physical flows.

In the exemplary embodiment, the actuator Ak activates the drives An.1, An.2, An.3 in such a manner that the latter rotate the three endless conveyor belts Fb.1, Fb.2, Fb.3 at an identical and temporally variable speed v.

The supply conveyor belt Z-Fb, which consists of a plurality of sections Fb.1, Fb.2, Fb.3 in the exemplary embodiment, transports the mail items further to a processing device.

In one embodiment, the processing device is a format separating device which divides the mail items into prescribed format classes. The format separating device is, for example, a drum with slots, as known from the above-mentioned U.S. Pat. No. 5,141,097 or DE 100 38 690 C1. These two references, as well as all of the other reference publications mentioned in this specification, as far as necessary for a better understanding of the invention and/or for additional information regarding the pertinent art, are herewith incorporated by reference in their entirety.

In another embodiment, the processing device is a singulator which singulates upright, flat mail items. Therefore, an upending apparatus is arranged upstream of the singulator. The upending apparatus upends the hitherto lying mail items such that each mail item after being upended stands on an edge.

The upending apparatus is configured, for example, as a "waterfall" chute that is formed with an edge over which the mail items slip downwards. In another configuration, the upending apparatus has oblique plates over which the mail items are transported.

FIG. 1 and FIG. 2 show schematically a "waterfall". Two smooth walls W.1 and W.2 and an underfloor conveyor belt U-Fb together form a transport channel Tk. The transport channel Tk transports mail items in the transport direction TR which is perpendicular to the plane of projection of FIG. 1. In this case, each mail item stands on an edge on the underfloor conveyor belt U-Fb, and the underfloor conveyor belt U-Fb is driven. Each mail item leans against a side wall W.1 or W.2. The oblique endless conveyor belt Fb.3 transports lying mail items to an edge which is formed by the wall W.1. The mail items drop over the edge, for which reason the configuration is referred to as a "waterfall" until the mail items are supported by the underfloor conveyor belt U-Fb.

The mail items upended in this manner are transported to the singulator Ver. The singulator Ver singulates the stream of upright mail items. A sequence of spaced apart mail items leaves the singulator Ver in the transport direction TR. A clearance which is greater than or equal to a prescribed minimum clearance occurs between in each case two consecutive mail items.

In all of the embodiments of the exemplary embodiment, the processing device has a desired throughput. The number—or a different quantity parameter value per unit of time—of mail items leaving the processing device is intended to lie within a prescribed desired range for the throughput. The desired range for the throughput may also be a single desired value.

Each mail item which is transported to the processing device leaves the processing device later. A pile-up of mail items which may result in mail items being backed up in a unit located upstream should not occur in the processing device. On the other hand, the processing device should not run empty, i.e. some mail items to be processed should always be located upstream of the processing device. Therefore, the prescribed desired throughput results in a desired range for a flow parameter which describes the quantity of mail items which reach the processing device per unit of time.

In one configuration, the number of objects which reach the processing device per unit of time is used as the flow parameter. It is also possible to measure the sums of the lengths of the objects—as seen in the transport direction T of the supply conveyor belt Z-Fb—per unit of time and to use them as the flow parameter. The "length" denotes the extent of a mail item in the transport direction T.

Another configuration is used if the processing device singulates flat mail items in such a manner that a sequence of mail items having a respectively defined clearance between two consecutive mail items is obtained. The clearance between the rear edge of a preceding mail item and the front edge of the following mail item should be greater than or equal to a prescribed minimum distance which depends on the configuration of a following processing device. The "singulating potential" per unit of time is used as the flow parameter. The singulating potential is the sum of the lengths of all of the mail items which reach the processing device per unit of time and are to be singulated, plus the sum of the clearance lengths, which are produced by the singulating operation, between the objects, plus the clearance length after the last of the singulated objects.

Distances between in each case two mail items are produced only by the singulating operation. Prior to the singulating operation, the distances and therefore the lengths of the clearances are not known. In one configuration, a minimum distance is prescribed between two mail items which leave the singulator in succession. The clearance which the singulator is intended to produce is at least as long as the minimum distance but is also not greater, as far as possible. The prescribed minimum distance is used as the clearance length.

In another configuration, the distances between objects which have already been singulated previously are measured. An average clearance length is calculated from the measured clearance lengths, for example by the average value or a sliding or weighted average value being formed.

As explained above, the flow parameter describes the supply of mail items to the processing device per unit of time. The flow parameter depends on a desired throughput through the processing device. The value of the flow parameter depends, inter alia, on the following variables:

the number of mail items which are tipped onto the supply conveyor belt Z-Fb per unit of time, the transport speed v at which the supply conveyor belt Z-Fb transports the mail items to the upending apparatus, and the transport speed at which the underfloor conveyor belt U-Fb transports mail items to the processing device.

The number of mail items tipped is inevitably variable. The actuator Ak activates the drives An.1, An.2, An.3 for the conveyor belts Fb.1, Fb.2, Fb.3 of the supply conveyor belt Z-Fb to have a temporally variable speed v. The flow parameter is therefore also a variable that is temporally variable. The two events involving a certain number of mail items being tipped onto the supply conveyor belt Z-Fb per unit of time and the supply conveyor belt Z-Fb assuming a certain transport speed v have the effect of two different temporal delays acting on the supply of mail items to the processing device.

A master regulator Re obtains, as a stipulation, a desired value FP_Des for the flow parameter as the quantity of mail items reaching the processing device per unit of time. Furthermore, in one configuration, the regulator Re evaluates measured values from the sensor Sen with the camera Ka and the image evaluation unit BAE. From the measured values, the regulator Re calculates the required transport speed v of the supply conveyor belt Z-Fb and of the underfloor conveyor belt U-Fb. In one configuration, a further sensor measures the flow of mail items on the underfloor conveyor belt U-Fb and likewise transmits the measured values thereof to the regulator Re. The regulator Re transmits the required transport speed v_Des as a stipulation to the actuator Ak.

In the configuration shown in the figures, the regulator does not require knowledge of the current transport speed v of the supply conveyor belt Z-Fb. However, it is possible for the current transport speed v also to be transmitted to the regulator Re.

The actuator Ak processes the measured values from the section clock generator TG and the desired values from the master regulator Re. The actuator Ak calculates actuating commands from the desired transport speed v_Des for the supply conveyor belt Z-Fb and transmits the calculated actuating commands to the actuator Ak. The actuator Ak correspondingly activates the drives An.1, An.2, An.3 of the supply conveyor belt Z-Fb in order to produce the desired transport speed v_Des. This entire sequence is preferably repeated continuously.

In one configuration, the drives An.1, An.2, An.3 of the supply conveyor belt Z-Fb are configured in the form of a servomotor. The servomotor realizes a desired transport speed v_Des prescribed thereto. The actual speed v set by the actuator Ak at the servomotors and at which the supply conveyor belt Z-Fb transports the mail item is therefore identical to the desired transport speed v_Des which the regulator Re has calculated and prescribed to the actuator Ak and which the actuator Ak converts into commands to the drives An.1, An.2, An.3 and at which the supply conveyor belt Z-Fb transports the mail item. An additional tachometer which measures the actual transport speed v is not required.

In another configuration, the drives An.1, An.2, An.3 are configured in the form of an unregulated drive. The actuator Ak prescribes a different physical variable from the transport speed v, and the drives An.1, An.2, An.3 convert the other variable, for example the electric current or the voltage, and, as a result, generate a transport speed v.

A tachometer is required in this case. The actual speed v of the supply conveyor belt Z-Fb is measured. For example, a tachometer in the form of a section clock generator TG generates one pulse per distance covered by the supply conveyor belt Z-Fb and therefore a mail item on the supply conveyor belt Z-Fb. The number of pulses per unit of time is proportional to the actual speed v of the supply conveyor belt Z-Fb. The actuator Ak evaluates signals from the section clock generator TG and transmits commands to the drives An.1, An.2, An.3 such that the drives An.1, An.2, An.3 move the conveyor belts Fb.1, Fb.2, Fb.3 at an actual speed v which is equal to the prescribed value v_Des.

The camera Ka produces a photograph Aufn[i] of the measurement sector MA at each of a plurality of successive recording times t[i] (i=1, ... ). In the exemplary embodiment, the camera Ka is fixed in position. All of the measurement sectors are identical in size. One measurement sector MA lies on the surface of the supply conveyor belt Z-Fb and is transported together with the supply conveyor belt Z-Fb to the processing device, i.e. at the variable transport speed v. The positionally fixed camera Ka produces photographs with a temporally constant field of view of consecutive measurement sectors.

The mail items which are located at a recording time t[i] in the measurement sector are transported for a distance further on the supply conveyor belt Z-Fb together with the measurement sector as far as the temporally next recording time t[i+1]. The length of the distance is the product of the temporal distance between t[i+1] and t[i] and the measured actual speed v of the supply conveyor belt Z-Fb.

In one configuration, the camera Ka has an input for trigger signals. The operation of the camera Ka producing a photograph of the measurement sector MA can be triggered from the outside and virtually without a time delay via the trigger input. By the activation being carried out, the image recording frequency λ at which the camera Ka produces photographs can be controlled from the outside via the trigger input. The trigger input is connected to the section clock generator TG, for example directly or via the actuator Ak, such that the image recording frequency λ is proportional to the number of pulses per unit of time generated by the section clock generator TG. This has the effect that the image recording frequency λ is always proportional to the actual speed v of the supply conveyor belt Z-Fb.

The photographs Aufn[1], Aufn[2], . . . are preferably produced in such a manner that the measurement sector of the supply conveyor belt Z-Fb, produced by the camera Ka at a recording time t[i], is adjacent directly and without an intermediate space and without an overlap to the measurement sector MA which the camera Ka has produced at the temporally preceding recording time t[i−1]. If the recording frequency λ is proportional to the actual transport speed v, then the supply conveyor belt Z-Fb always covers the same distance between two consecutive recording times t[i], t[i+1], no matter what the transport speed v is. In this case, the configuration in which the measurement sectors shown are directly adjacent to one another can be achieved in a simple manner by each nth pulse of the section clock generator TG triggering the production of a photograph by the camera Ka. The number n and the position of the camera Ka relative to the supply conveyor belt Z-Fb can be adjusted in a suitable manner.

However, this configuration cannot be realized in particular if the image recording frequency λ of the camera Ka cannot be controlled from the outside. In this case, the camera Ka produces rough photographs, specifically in such a manner that two temporally directly consecutive rough photographs at the times t[i] and t[i+1] show two measurement sectors which partially overlap. The image evaluation unit BAE processes the rough photographs and produces processed photographs. The sequence of the processed photographs Aufn[1], Aufn[2], . . . shows measurement sectors which are directly adjacent to one another and do not overlap. The processed photographs are evaluated in order to calculate the quantity parameter values.

In both configurations, the image evaluation unit BAE evaluates the respective photograph Aufn[i] from each recording time t[i] and, by means of the evaluation of the photographs, calculates a value which a quantity parameter MP takes on at the recording time t[i]. The quantity parameter MP is a measure of the temporally variable quantity of objects, i.e. here of flat mail items, in the measurement sector MA. The measurement sector MA is preferably of a width such that it covers the entire width of the conveyor component Z-Fb, i.e. that no mail item lies laterally next to the measurement sector. The length MA of the measurement sector MA is measured once in advance and is temporally constant.

The sequence of values for the quantity parameter MP, namely one value in each case per recording time t[i], is transmitted by the sensor Sen to the regulator Re. In addition, a sequence of desired values for the flow parameter is transmitted to the regulator Re. The regulator Re calculates a sequence of desired transport speeds v_Des of the supply conveyor belt Z-Fb. The sequence is transmitted to the actuator Ak. The actuator Ak activates the drives An.1, An.2, An.3 of the supply conveyor belt Z-Fb in the manner described above such that the supply conveyor belt Z-Fb produces the desired transport speed v_Des.

In one configuration, the flow parameter is the number of objects per unit of time which leave the supply conveyor belt Z-Fb and reach the upending apparatus. In this configuration, the sensor supplies, as the value of the quantity parameter MP, a proximity value for the respective number of mail items in the measurement sector MA.

In another configuration, the above described "singulating potential" is used as the flow parameter. The sum of the lengths of the mail items which are located in each case in the measurement sector MA, plus the sum of the lengths of the clearances to be produced between the mail items (sum of the distances) plus the length of the clearance to be produced after the final mail item to be singulated are used as the value of the quantity parameter MP.

It is described below how the sensor Sen for each recording time t[i] in each case determines a value of the quantity parameter MP.

The image evaluation unit BAE evaluates each photograph of a measurement sector. This evaluation is carried out with the aim of determining the proportion of the overall area of the measurement sector taken up by that subregion of the measurement sector which is covered by mail items. In the exemplary embodiment, the mail items are located in the measurement sector on the supply conveyor belt Z-Fb. It is not differentiated here whether a point of the measurement sector is covered by a single mail item or by a plurality of mail items lying one above another. This is because, in order to ascertain this, it would be necessary either to use a further image recording device which produces photographs from the side, and an evaluation unit for the photographs. Or a spacer sensor or height sensor measures a height profile of the mail items in the measurement sector MA. Both options are complicated and, owing to the invention, are not required.

A configuration for measuring the proportion of the area of the entire area of the measurement sector which is covered is described below.

This configuration which is described below requires little computational time for the image evaluation and supplies correct results. It does not require any assumptions whatsoever about the shape of the transported objects, here mail items.

Each photograph Aufn[i] is preferably produced by a digital camera Ka which has a multiplicity of small image recording components. The photograph Aufn[i] of the measurement sector therefore consists of a multiplicity of individual pixels which are arranged in a matrix, wherein B[i, k, j] is the pixel in the line k and the gap j in the matrix, where k=1, . . . , M and j=1, . . . , N. The photograph therefore has M×N pixels.

Each image recording component of the camera Ka measures the respective light intensity in the component. As a result, the camera Ka measures an intensity value I[i, k, j] (k=1, . . . , M; j=1, . . . , N) for each pixel B[i, k, j]. The photograph is binarized. As a result, a binary image Bin with M×N binary values is produced. A limit l_min is prescribed for this. l_min is the minimum intensity value of the light which is reflected by a mail item lying on the supply conveyor belt Z-Fb and reaching the camera Ka. The binary image has M×N binary values Bin[i, k, j] (i=1, . . . , M; j=1, . . . , N). The M×N binary values are calculated according to the computing rule Bin[i, k, j]=1, if I[i, k, j]>=l_min, and otherwise Bin[i, k, j]=0.

That subregion of the measurement sector which is covered by the mail items at the recording time t[i] takes up a proportion proportion[i] of the entire area of the measurement sector. The proportion is equal to the sum of all of the binary values, divided by the number of all the binary values, i.e. is calculated according to the computing rule $$\text{Proportion}[i] = \sum_{k=1}^{M} \sum_{j=1}^{N} Bin[i, k, j]/(M*N)$$

The computing rule therefore supplies the proportion of all of the pixels B[i, k, j] having intensity values I[i, k, j]>=I_min at all of the M*N pixels.

Other configurations are also possible. That subregion of the measurement sector which is covered by mail items is usually delimited by at least one closed segmental line which consists of a plurality of individual segments. The covered region can consist of a plurality of individual, non-cohesive regions. There can be holes in the region which is enclosed by a segmental line. The boundary of such a hole is likewise in the form of a segmental line.

The area of such a region can be calculated by suitable image evaluation methods.

Figure 3:
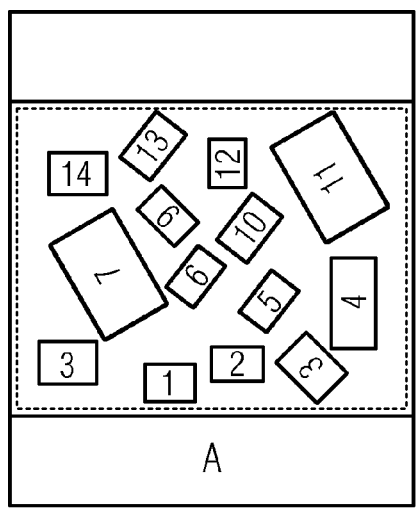
FIG. 3 shows three different occupancies of the supply conveyor belt with mail items.
Figure 3:
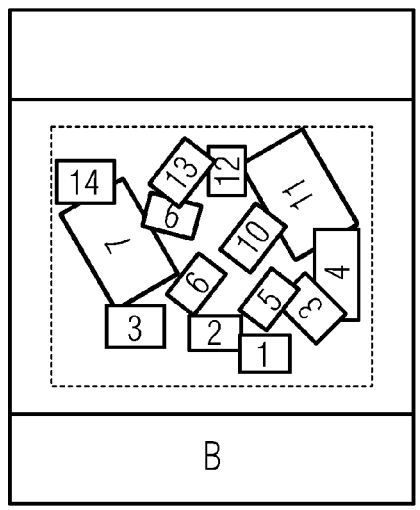
Figure 3:
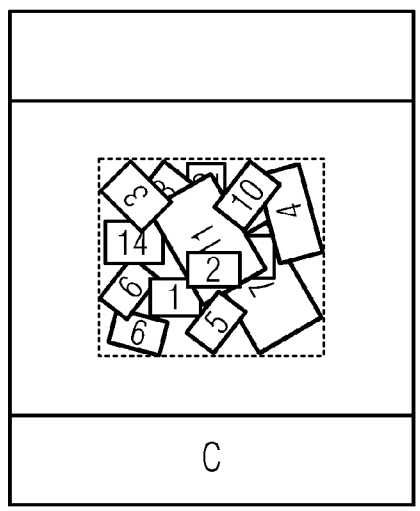

FIG. 3 shows by way of example three differently dense occupations of the supply conveyor belt by in each case the same quantity of mail items lying on the supply conveyor belt Z-Fb. The mail items occupy three different subregions of a measurement sector.

Figure 4:
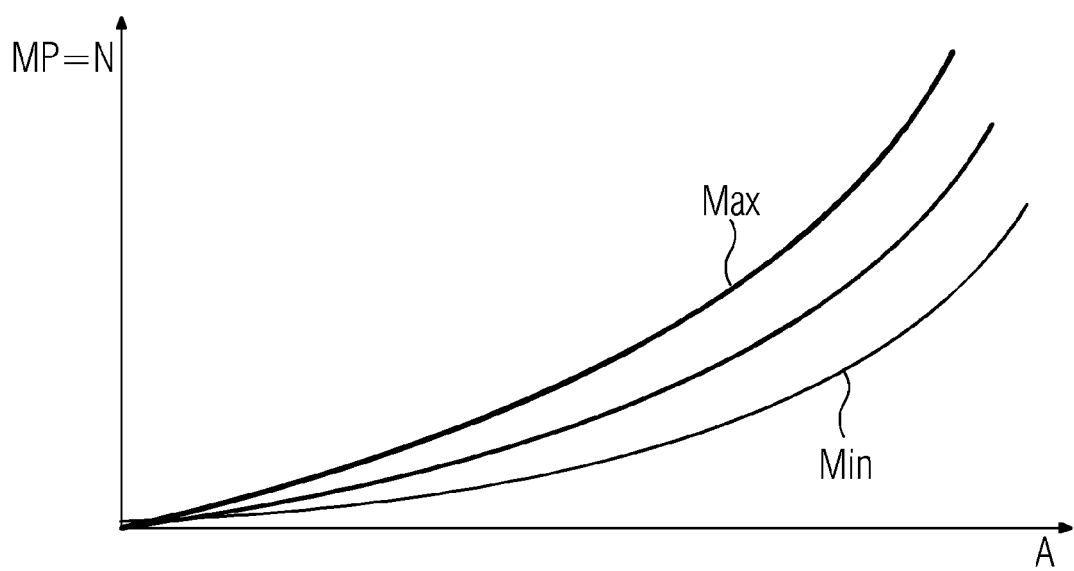
FIG. 4 shows a functional relationship between the area covered by mail items and the number of mail items.

FIG. 4 shows by way of example three theoretically determined functional relationships between the number N of mail items on the supply conveyor belt Z-Fb (y axis) and the proportion of the area on the surface covered by the mail items, with reference to the entire area (x axis).

For an x value, the three y values supply three different numbers of mail items to an identical covered proportion. That is to say, in FIG. 4, the number of mail items is used as the quantity parameter MP. The bottom curve in FIG. 4 shows the minimal number, and the top curve the maximum number for an identical covered proportion (x axis). The three functional relationships result from differently dense occupancies, as illustrated in FIG. 3. It can be seen in FIG. 4 that the functional relationship varies relatively little for differential dense occupancies and the variance only moderately increases even at higher occupancy densities.

In one configuration, the image evaluation unit BAE of the sensor Sen has a parameter value calculation unit and a data memory DSp in which a computer-executable functional relationship Zus between the quantity parameter MP and the proportion of the area of the covered region with reference to the entire area of the measurement sector MA is stored.

In another configuration, the functional relationship is characterized by a small number of parameters, for example of a polynomial, and the required value is calculated at each calculation time.

Figure 5:
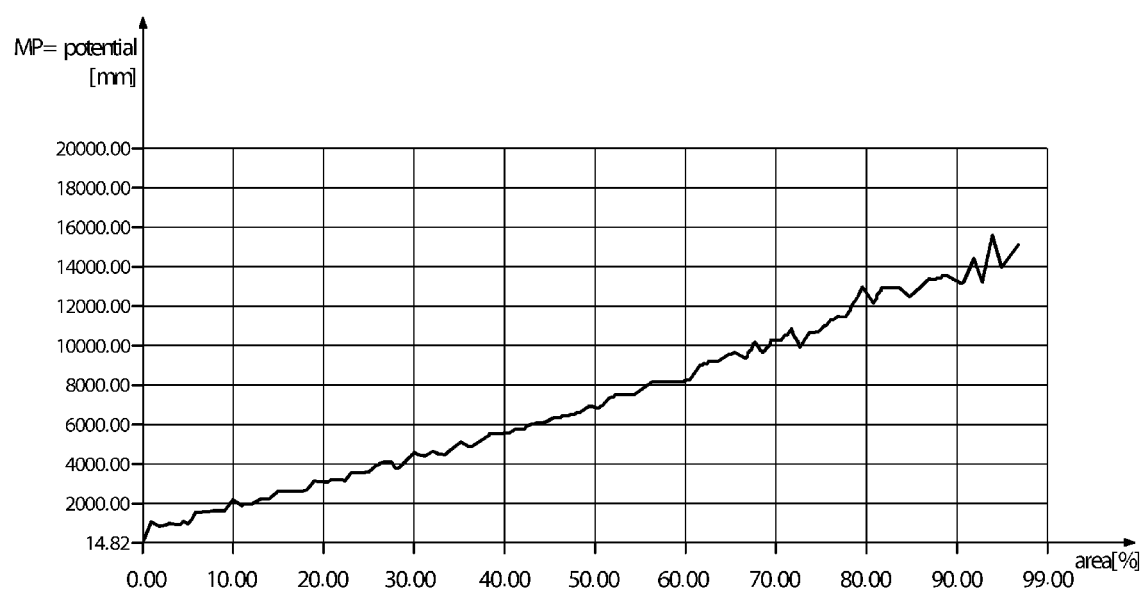
FIG. 5 shows a functional relationship between the area covered by mail items and a quantity parameter.

FIG. 5 shows an exemplary functional relationship Zus between the quantity parameter "singulating potential" (Y axis) and the proportion of the covered area of the measurement sector MA (x axis), in which the relationship has been determined experimentally. It can be seen that the experimentally determined relationship readily corresponds to the relationship which should be theoretically expected and which FIG. 4 shows.

It can furthermore be seen that the curve in FIG. 5 rises only slightly non-linearly, i.e. non-progressively. The evaluation of the functional relationship shown in FIG. 5 therefore reliably supplies a good proximity value for the quantity parameter value both at a low covering and at a high covering. A differentiation between different values of the quantity parameter is therefore possible even when the proportions covered are high.

The covered proportion, i.e. the quotient from the covered area and entire area of the measurement sector, is calculated in the manner just described, with the entire area of the measurement sector MA remaining temporally constant and the covered area being measured, as described above, by image evaluation.

The covered proportion which is determined is transmitted to the parameter value calculation unit of the sensor Sen. The calculation unit evaluates the stored functional relationship and supplies a respective quantity parameter value for each recording time t[i]. In the exemplary embodiment, this sequence of values for the quantity parameter is transmitted to the regulator Re.

The functional relationship Zus stored in the data memory DSp is preferably produced in advance experimentally. Various samples containing flat mail items are preferably prescribed for this. The samples differ by the number of mail items of which the respective sample consists and, under some circumstances, by different types of mail items.

For each sample, the following sequence is carried out at least once, preferably more than once:

The mail items of the sample are tipped onto the supply conveyor belt Z-Fb.

The supply conveyor belt Z-Fb transports the mail items past the camera Ka.

The camera Ka produces at least one photograph of the mail items, and therefore all of the mail items are located in the measurement sector MA at the recording time.

The at least one photograph is evaluated, and that proportion of the measurement sector MA which is covered by the mail items is determined, as described above, by image evaluation.

The value which the quantity parameter actually assumes for the sample is exactly measured. For example, the sample is counted.

Each sequence supplies a respective measurement point in an x-y diagram, in which the covered proportion is plotted on the x axis, for example in percent, and the quantity parameter is plotted on the y axis. If different measured values for the quantity parameter are measured for the same value of the covered proportion, the mean of the measured values is taken.

In one configuration, the sequence is carried out with real mail items and with a real camera Ka. In another configuration, each sequence is simulated by a computer simulation, in which a random generator randomly distributes the simulated mail items in a sample to a simulated supply conveyor belt.

The functional relationship is preferably determined by means of a regression analysis. For example, it is prescribed that the functional relationship should have the form $y=a\_2*x^2+a\_1*x+a\_0$ or the form $y=a\_2*\exp(a_{-1}x)+a\_0$, and the three parameters a_2, a_1 and a_0 are determined such that the square sum of errors or a different error measure is minimized. The functional relationship Zus generated in this manner is stored in the data memory DSp of the calculation unit of the sensor Sen.

In one configuration, the stored functional relationship is continuously adapted in the running mode. The configuration presupposes that the value which the quantity parameter has actually taken at a recording time t[i] is measured at a later time. For example, the number of mail items actually located in the measurement sector at the recording time t[i] is measured at a later time. Since the actual transport speed v of the supply conveyor belt Z-Fb is continuously measured, it can be determined when the mail items located in the measurement sector under the camera Ka at the recording time t[i] have passed through the following processing device. After the passage through, the quantity parameter can be exactly measured with relatively little outlay. The number and the singulating potential of mail items can be easily exactly measured if the mail items have already been singulated.

For each recording time t[i]
as described above, the covered proportion in the measurement sector is measured and
at a later time the actual value taken on by the quantity parameter at the time t[i] is measured.

Each measurement supplies a value in the x-y diagram described above.

In one configuration, a regression analysis is carried again, for example as described above. It is possible to use for the regression analysis the value pairs obtained previously in the running mode and, in addition, at least at the beginning of the running mode, those value pairs which were previously determined experimentally by means of the samples.

In one modification, the functional relationship is adapted by the working point of the functional relationship being displaced by an "offset". Let f_prev be the functional relationship determined previously experimentally. The corrected functional relationship f_corr is determined according to the following computing rule:

$$f\_corr(x) = f\_prev(x + \text{offset}).$$

The offset is preferably determined in such a manner that the difference between the quantity parameter values supplied by the sensor Sen and values measured exactly later on is minimized. The offset is determined, for example, using the final N measured values, wherein N>1 is a prescribed value. Therefore, a sliding window of measured values is used. The offset is determined in such a manner that a prescribed error measure is minimized, for example a weighted square sum of errors.

The invention claimed is:

1. A method for automatically measuring a quantity parameter, the quantity parameter describing a transport of objects by way of a conveyor component, with the objects to be transported lying on the conveyor component during the measurement, the method which comprises:
   at least one recording time, taking in each case at least one computer-evaluatable photograph of a measurement sector of the conveyor component, and
   determining a value for a quantity parameter that describes a quantity of objects transported at the recording time,
   wherein each determining step includes a step of evaluating the at least one photograph taken at the recording time,
   measuring, for each recording time during the determination of the quantity parameter value, a proportion of a respective measurement sector which is covered at the recording time by objects lying on the conveyor component, and thereby evaluating the photograph of the respective measurement sector taken at the recording time; and
   calculating the value taken on by the quantity parameter at the recording time, and thereby applying to the covered proportion measured a prescribed, computer-executable, functional relationship between
   the quantity parameter and
   the covered proportion of the measurement sector.

2. The method according to claim 1, wherein the step of evaluating each photograph comprises the following steps:
   drawing in the depiction of the measurement sector a closed curve around the depiction of that subsector which is covered by objects on the conveyor component;
   measuring an area of the region enclosed by the closed curve; and
   calculating the covered proportion using the area of the region enclosed by the closed curve.

3. The method according to claim 2, which comprises:
   approximately calculating the area of that subsector of the measurement sector which is covered by objects, to form an approximately calculated subsector area, by:
   using, as the subsector area,
   the area of the enclosed region, or
   a product of the area of the enclosed region after a prescribed correction factor, or
   a product of the area of the enclosed region after a correction factor which depends on a number of uncovered holes in the enclosed region, and
   calculating the covered proportion as a quotient of the approximately calculated subsector area and the size of the measurement sector.

4. The method according to claim 1, which comprises:
   producing in each case at least one photograph of the conveyor component at a plurality of successive recording times, and
   thereby producing the photographs such that the measurement sector of the conveyor component shown by a photograph produced at a recording time is directly adjacent to that measurement sector shown by the photograph taken at the immediately preceding recording time.

5. The method according to claim 1, which comprises using as the quantity parameter a parameter selected from the following group:
   a number of objects in the measurement sector; and
   a sum of the lengths of all of the objects in the measurement sector.

6. A method for transporting objects with a transport device, the method which comprises:
   placing the objects on a conveyor component of the transport device and moving the conveyor component together with the objects by the transport device;
   carrying out the method according to claim 1 by measuring a quantity parameter describing a transport of the objects by the transport device, wherein the objects lie on the conveyor component during the measurement; and
   varying a transport speed at which the conveyor component transports the objects depending on at least one measured quantity parameter value.

7. The method according to claim 6, which comprises:
   transporting flat objects with the transport device and transporting the flat objects to a singulating device;
   singulating the flat objects with the singulating device and outputting a sequence of spaced-apart objects from the singulating device, the sequence of spaced-apart objects having a clearance between two consecutive objects; and
   using as the quantity parameter a sum of a length of all of the objects in the measurement sector plus a sum of the lengths of all of the clearances to be produced between the objects in the measurement sector and a length of the clearance to be produced behind the final object.

8. The method according to claim 7, which comprises:
   measuring the lengths of the clearances actually produced between the objects in the singulating step; and using the measured clearance lengths for calculating the quantity parameter value for further objects to be singulated.

9. The method according to claim 6, which further comprises:
transporting the objected with the transport device to a processing device and processing the transported objects with the processing device;
prescribing a desired region for a flow parameter describing a flow of objects to the processing device;
controlling, with a closed-loop control device, a transport speed at which the transport device transports the objects, wherein the closed-loop control device uses:
the prescribed desired region for the flow parameter, and
the at least one measured value for the quantity parameter;
calculating with the closed-loop control device a desired transport speed using the desired region;
calculating the desired transport speed with the closed-loop control device and thereby using:
the desired value for the flow parameter; and
the at least one measured value for the quantity parameter; and
transmitting the desired transport speed to the transport device.

10. The method according to claim 1, which further comprises:
measuring exactly at a later time at least one value for the quantity parameter which describes the quantity of objects transported at a recording time; and
adapting the prescribed functional relationship using the quantity parameter value measured exactly at the later time and the proportion covered at the recording time.

11. The method according to claim 1, which comprises:
ascertaining the functional relationship experimentally, by repeatedly measuring the following for a sample of objects:
the quantity parameter value for the objects in the sample; and
the proportion of the measurement sector covered by the objects in the sample.

12. The method according to claim 1, wherein:
the photographs are produced such that
each photograph comprises a plurality of pixels; and
an intensity value is measured in each case for at least one photograph and each pixel of the photograph; and
the step of measuring the proportion of the respective measurement sector which is covered by objects at a recording time comprises a step of calculating a quotient of:
a number of pixels having an intensity value greater than a prescribed limit; and
an overall number of pixels in the photograph; and
using the quotient as the covered proportion.

13. An apparatus for automatically measuring a quantity parameter describing a transport of objects by way of a conveyor component configured for transporting objects lying on the conveyor component, the apparatus comprising:
an image recording device configured to take, at least one recording time, in each case at least one photograph of a measurement sector of the conveyor component;
an image evaluation unit connected to said image recording device, said image evaluation unit being configured for determining a value for a quantity parameter describing a quantity of objects transported;
said image evaluation unit being configured to evaluate, during each determination of the quantity parameter value, the at least one photograph taken at the recording time;
said image evaluation unit including a parameter value calculation unit configured for calculating the quantity parameter value;
said image evaluation unit including a relationship data memory configured for storing a computer-executable functional relationship between
the quantity parameter and
the covered proportion of the measurement sector;
said image evaluation unit being configured so as, during the determination of the quantity parameter value for a recording time, to measure a proportion of the respective measurement sector that is covered at the recording time by objects lying on the conveyor component, wherein, for this purpose, said image evaluation unit uses the photograph of the respective measurement sector taken at the recording time; and
said parameter value calculation unit being configured for calculating the quantity parameter value by applying the stored functional relationship to the covered proportion measured.

14. An assembly for transporting objects, comprising:
a transport device, said transport device having a conveyor component configured to transport objects lying thereon;
said transport device being configured to move said conveyor component for transporting the objects lying on said conveyor component,
a measuring apparatus according to claim 13 for automatically measuring a quantity parameter during a transportation of objects by said transport device; and
an actuator connected to said measuring apparatus and configured to change a transport speed at which said conveyor component transports the objects depending on the quantity parameter value determined by said measuring apparatus.

* * * * *